(No Model.)
H. J. GOFF & T. E. PLOUGHE.
SWINGING GATE.
No. 320,929. Patented June 30, 1885.
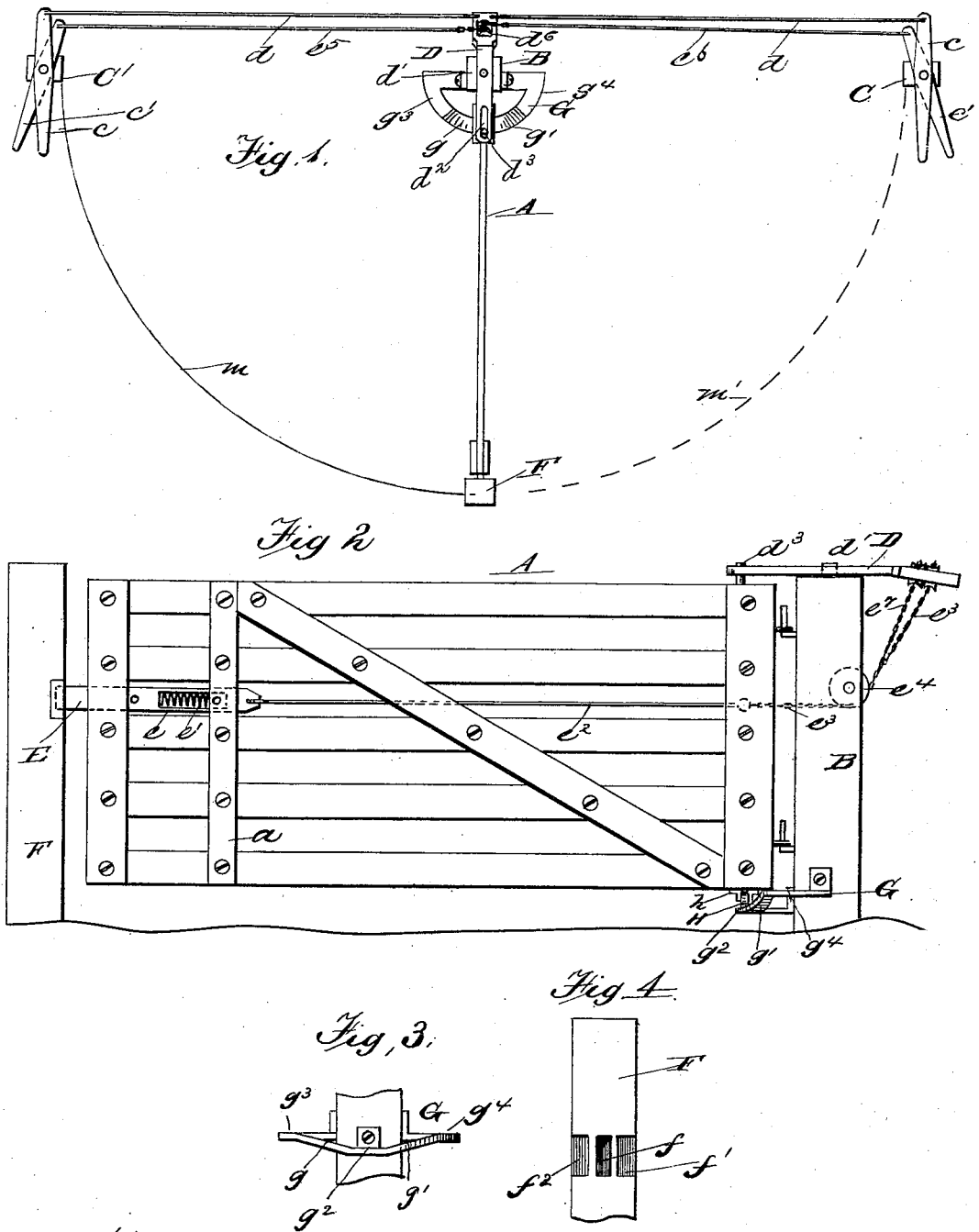

UNITED STATES PATENT OFFICE.

HENRY J. GOFF AND THOMAS E. PLOUGHE, OF KEMPTON, INDIANA.

SWINGING GATE.

SPECIFICATION forming part of Letters Patent No. 320,929, dated June 30, 1885.

Application filed April 19, 1884. (No model.)

*To all whom it may concern:*

Be it known that we, HENRY J. GOFF and THOMAS E. PLOUGHE, citizens of the United States, residing at Kempton, in the county of Tipton and State of Indiana, have invented certain new and useful Improvements in Swinging Gates; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to farm-gates; and it consists in certain new and useful improvements, substantially as hereinafter described, and pointed out in the claim.

In the drawings which form a part of this specification, and in which like letters of reference indicate like parts, Figure 1 is a plan view of a gate provided with our improvements. Fig. 2 is a side elevation of the gate shown in Fig. 1, and Figs. 3 and 4 are detached detail views of parts of our improvements.

Referring to the drawings, A designates a gate hinged to a post, B, and provided with swinging and latching devices, as will be hereinafter described.

C C' designate posts set equidistant from and in line with the post B, and at right angles to the gate when closed.

$c\ c'$ designate short levers fulcrumed upon the top of each of the posts C C'. The levers $c$ at each side of the gate are connected by rods $d$ with the rear end of a lever, D, fulcrumed at $d'$ to the top of the post B. The lever D is provided at its forward end with a slot, $d^2$, through which a pin, $d^3$, passes into the top of the vertical bar of the gate. By drawing upon either of the levers $c$ the gate will be caused, through the rod $d$, attached thereto, and lever D, to swing upon its hinges in the direction of one or the other of the dotted lines $m\ m'$.

E designates a latch or bar preferably placed between two horizontal bars at the forward end of the gate, near the top thereof. The latch is kept in a normal protracted position and in engagement with a recess, $f$, in the latch-post F by a spiral spring, $e$, placed within a recess or slot, $e'$, in the latch E. The spring $e$ bears at its forward end against the shoulder formed by the forward end of the slot $e'$, and at its rear end against vertical slats $a$, secured to the horizontal bars of the gate.

$e^2$ designates a rod extending from the rear end of the latch E to and entering an aperture in the vertical rear bar of the gate.

$e^3$ designates a chain connected to the end of the rod $e^2$, and passing thence outward through the rear bar of the gate to and through an aperture in the hinge-post B, thence passing around a pulley, $e^4$, pivoted in said post, thence upward and over a pulley pivoted in a slot, $d^6$, formed in the rear end of the lever D, and thence to and connected with the end of a rod, $e^5$, that extends to one of the levers $c'$.

$e^6$ designates a similar rod extending from the remaining lever $c'$, and is connected at its inner end to a chain, $e^7$, that passes over a second pulley pivoted in the slot $d^6$, and thence to and connected with the chain $e^3$ near the pulley $e^4$. (See Fig. 2.) By drawing upon either of the levers $c'$ the latch E will be drawn back and the gate be left free to be moved by the levers $c$, as hereinbefore described.

G designates a plate secured near the bottom of the post B at each side thereof, and is provided upon its forward upper surface with two short inclined portions, $g\ g'$, joined together by a level portion, $g^2$. At the tops of the inclines $g\ g'$, and extending thence to the rear of the plate at each side of the post, are level portions $g^3\ g^4$, for a purpose hereinafter described.

H designates a roller mounted in lugs $h$, secured to the rear vertical post of the gate. The roller rides upon the upper surface of the plate G. When the gate is closed, the roller rests upon the level portion $g^2$ of the plate, and when it is swung open in either direction the roller rides up one of the inclines $g\ g'$ and upon one of the level portions $g^3\ g^4$, thereby raising the gate.

When it is desired to close the gate, it is necessary to move it but a short distance, as the weight of the gate will cause it to close automatically when the incline is reached by the roller H, as will be readily understood.

The latch-post F is provided at each side of the recess $f$ with inclined portions $f'\ f^2$, for the purpose of guiding the latch to and into the recess $f$.

We are aware that it is not broadly new to provide a latch-releasing and an outwardly and inwardly gate-swinging mechanism, whereby a gate can be opened or closed without dismounting from a horse or leaving a vehicle.

We attach importance to having two sets of levers, one set adapted simply to withdraw the latch without lifting the gate bodily from the catch, and the other set to open the gate away from the head of the team in moving in either direction; also to the construction of the lever D in connection with the devices for withdrawing the latch.

We are aware of Patents No. 265,274, October 3, 1882, No. 143,342, September 30, 1883, and No. 56,412, of July 17, 1866, and do not claim the devices therein shown.

Having thus described our invention, what we claim, and desire to secure by Letters Patent of the United States, is—

In a swinging gate, substantially as described, the combination of the hinge-post B, and a plate, as G, secured to the lower part of the post B, and having reverse inclines $g$ $g'$ and plane portion $g^4$, the gate A, having a spring-latch and a friction-roller, as H, resting upon the plate G, means for operating the latch, the lever D, pivoted to the top of the hinge-post, and having a slot which embraces a pin, $d^3$, beyond the vertical plane of the hinges, and connections, as shown, whereby the action of the lever D forces the roller H to ride along the plate G, as and for the purposes set forth.

In testimony whereof we affix our signatures in presence of two witnesses.

HENRY J. GOFF.
THOMAS E. PLOUGHE.

Witnesses:
D. H. KEMP,
J. A. CLINE.